United States Patent

Hogan et al.

Patent Number: 5,964,504
Date of Patent: *Oct. 12, 1999

[54] NECK SUPPORT DEVICE FOR USE WITH AN AUTOMOBILE SEAT

[75] Inventors: Jule Hogan, Warren; Steven G. Schuman, Wixom, both of Mich.

[73] Assignee: Hogan & Schuman Development L.L.C., Troy, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/047,065

[22] Filed: Mar. 24, 1998

Related U.S. Application Data

[60] Provisional application No. 60/042,410, Mar. 26, 1997.

[51] Int. Cl.⁶ .................................................. A47C 7/38
[52] U.S. Cl. ......................... 297/397; 297/220; 297/400
[58] Field of Search ..................................... 297/397, 220, 297/284.5, 395, 398, 399, 400, 401, 402, 404

[56] References Cited

U.S. PATENT DOCUMENTS

| | | |
|---|---|---|
| 91,389 | 6/1869 | Weeden ..................................... 297/401 |
| D. 312,019 | 11/1990 | Woods et al. . |
| 3,719,185 | 3/1973 | Hanes . |
| 4,114,948 | 9/1978 | Perkey . |
| 4,274,673 | 6/1981 | Kifferstein . |
| 4,758,047 | 7/1988 | Hennington . |
| 4,870,725 | 10/1989 | Dubowik ................................... 24/442 |
| 5,123,704 | 6/1992 | Peterson ................................... 297/395 |
| 5,345,633 | 9/1994 | Harnish . |
| 5,542,746 | 8/1996 | Byjarun .............................. 297/404 X |

*Primary Examiner*—Peter M. Cuomo
*Assistant Examiner*—David E. Allred
*Attorney, Agent, or Firm*—Gifford, Krass, Groh, Sprinkle, Anderson & Citkowski, P.C.

[57] ABSTRACT

An automobile neck rest cushion which can be detachably connected to the upright portion of an automobile seat. The cushion is shaped so that it tapers from the thickest portion at the center of the cushion outwardly toward the thinnest portion which is the point at which the front portion meets the rear portion. The shape is designed for providing support for the neck while not restricting or interfering with the neck and jaw when the driver turns his head to either side. A strap is provided which is used to attach an position the cushion onto the seat back.

2 Claims, 3 Drawing Sheets

NECK SUPPORT DEVICE FOR USE WITH AN AUTOMOBILE SEAT

This application claims the benefit of U.S. Provisional Application No. 60/042,410 filed Mar. 26, 1997.

BACKGROUND OF THE INVENTION

I. Field of the Invention

The present invention relates to a device used for supporting the neck of a person while riding in an automobile. More particularly, the device consists of a specially shaped cushion and a positioning means, such as a strap, which will attach the cushion to the seat back of an automobile seat.

II. Description of the Prior Art

Cushions are used in automobiles in many different locations and for many different purposes. Automobile seats have traditionally consisted of a lower portion and a back portion. In recent years, a headrest portion has been added to the top of the back portion of the seat. Each of these portions are designed for specific functions. The lower portion provides support for the legs, the rear portion provides support for the driver's back and the headrest provides support and protection for the driver's head. The headrest portion is either attached directly to the top of the seat back portion or is supported by a metal rod or rods. In many designs, the headrest portion is height adjustable to allow the passenger to position the headrest at a height which places the headrest cushion in horizontal alignment with the rounded back portion of the passenger's head. This positioning is important for both comfort to the driver and for head protection in the event of an accident. This positioning of the headrest above the seat back leaves a gap between the passenger's neck and the seat.

In addition to the aforementioned standard seat construction elements, an aftermarket has developed which caters to other specialized needs of the drivers and occupants of automobiles. One of the areas in which a great deal of inventive effort has been focused is the field of greater protection for the head. The head is an area that is particularly vulnerable in the event of an accident. To increase the protection of the driver's head, there have been numerous devices invented which add additional support and protection. The primary purpose of the aftermarket cushions has been to support and protect the head and do not provide positive support for the neck. These prior devices have had the problem of obstructing the jaw and head as the head turns from side to side. As the head turns from side to side to allow viewing out of the side windows, the prior art cushion devices prevent the head from turning in its natural manner and actually levers the head away from the protection and support of the cushion and headrest. This levering effect causes a gap to form between the rear of the head of the passenger and the headrest.

SUMMARY OF THE INVENTION

The present invention consists of a shaped cushion and attachment means for use with an automobile seat. In one embodiment, the cushion is shaped similar to a football cut in half along its longest axis. The cushion's ovoid shape is designed to support the neck without interfering with the jaw of the passenger. The cushion is specially shaped with the center of the cushion being the thickest portion with the outwardly extending edges tapering down and away from the driver's neck to allow proper support of the neck without interfering with the driver's neck or head when the driver turns his head. A strap is attached to the cushion to properly position the cushion relative to the neck. The strap can be connected in either a horizontal fashion or vertical fashion with respect to the seat back. The principal object of the invention being to provide a cushion to properly support the neck while allowing the driver to turn his head without his head or jaw being obstructed by the cushion as is the case with the prior art.

Other objectives and advantages of this invention will become apparent from the description, the drawings and the claims.

The details of the present invention will be described in conjunction with the drawings. It will be understood, however, that the present invention will have applications in other areas of goods and that the description of the present invention with respect to the materials employed is by way of example only.

BRIEF DESCRIPTION OF THE DRAWING

A better understanding of the present invention will be had upon reference to the following detailed description when read in conjunction with the accompanying drawings in which.

DETAILED DESCRIPTION OF THE PREFERRED EMBODIMENTS OF THE PRESENT INVENTION

Figure 1:
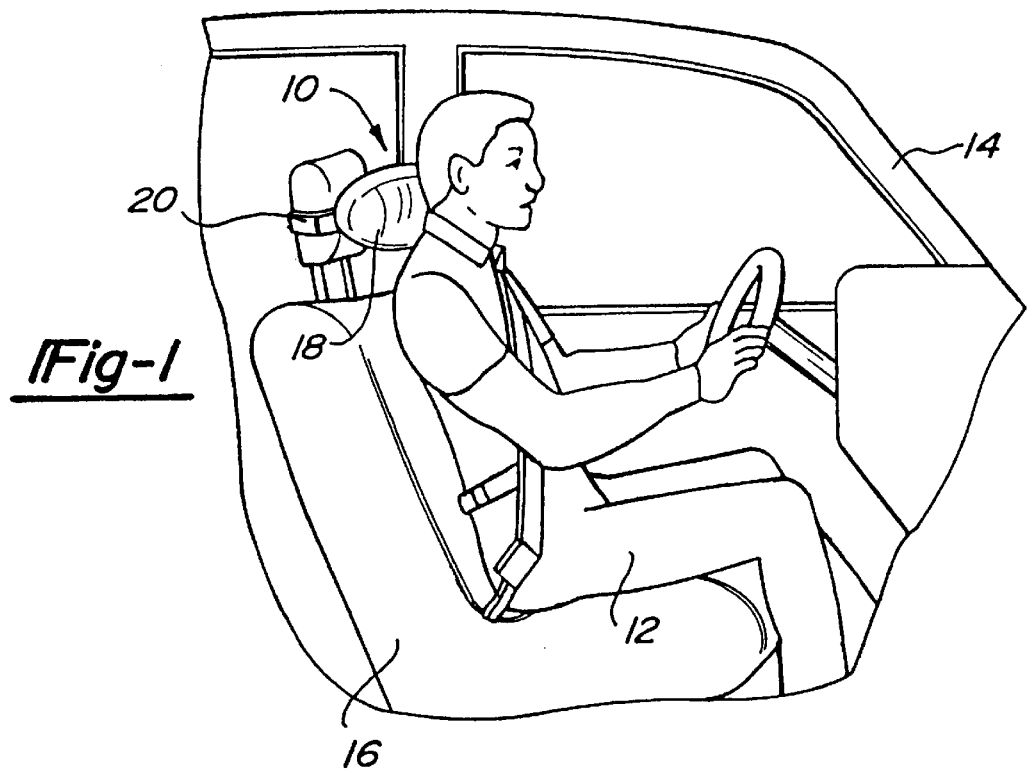
FIG. 1 is a side perspective view of a neck support device as installed in an automobile.

As shown in FIG. 1, the present invention is directed to a neck support device 10 for supporting the neck of a passenger 12 riding in an automobile 14. The neck support device 10 is useful not only for the driver but for any passenger riding in the automobile 14. The neck support device includes a cushion 18 and a strap 20. The cushion 18 has the shape of a football which has been severed by a vertically extending plane.

Figure 2:
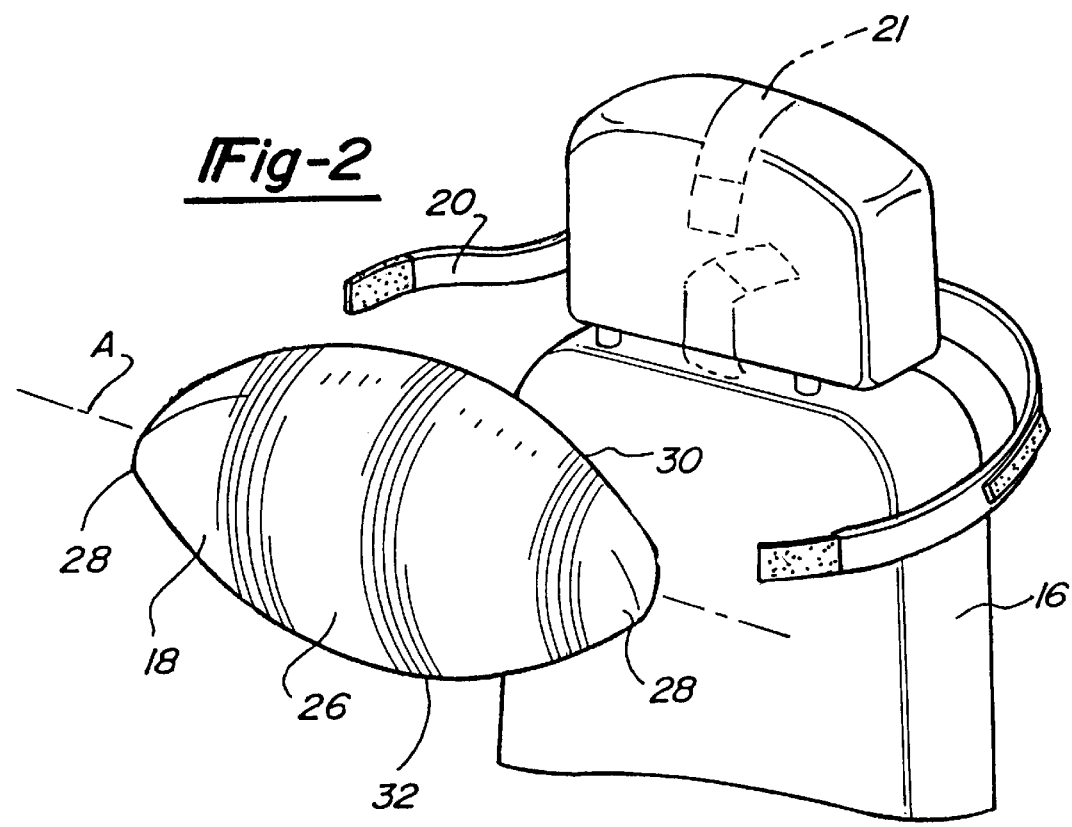
FIG. 2 is a close-up side perspective view of the neck support device in accordance with the invention.

With reference to FIG. 2, in a preferred embodiment of the neck support device 10, the cushion 18 has a contoured front portion 22 for supporting the neck of the wearer and a generally flat rear portion 24 resting against the headrest or automobile seat 16 (FIG. 2). The cushion 18 has a center portion 26 with a semi-circular cross-section and a pair of ends 28 extending on a longitudinal horizontal axis "A". The center portion 26 tapers inwardly to an end. The cushion is manufactured from flexible urethane foam material. Prior to the foam's placement into the mold, a coating of mold release material is sprayed into the mold. This coating of mold release causes the urethane foam material to form a surface which is smooth and eases the process of removing the cushion from the mold. The front portion 22 is contoured in such a manner that the cushion 18 will fit comfortably between the neck of the passenger and the seat back and headrest. The center portion of the cushion is the thickest area of the cushion with a curved upper edge 30 and lower edges 32 converging at each end 28. By shaping the cushion in this manner numerous benefits are bestowed upon the driver. Among those benefits are that the driver's neck will be properly supported and the head will not be obstructed as it turns from side to side.

Figure 3:
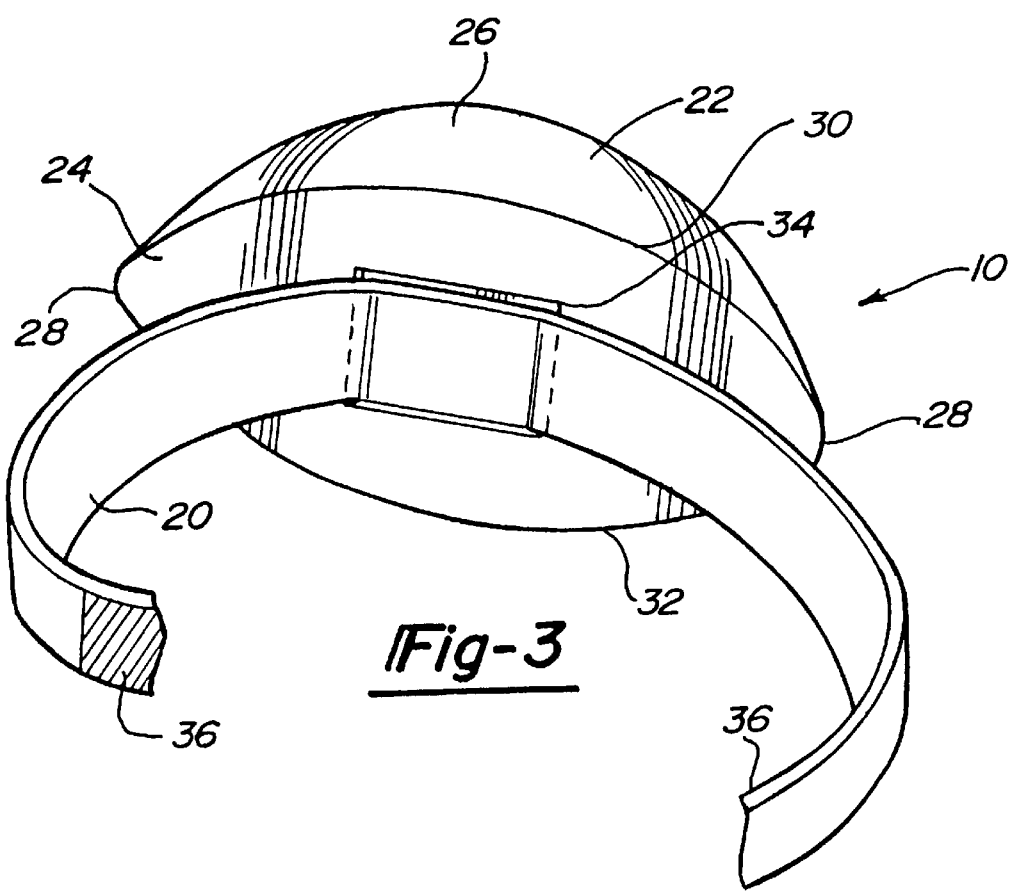
FIG. 3 is a perspective view of the neck support device from the rear in accordance with the invention.

As shown in FIG. 3, in the preferred embodiment, the rear portion 24 has a planar surface which is ovoid in shape and defined by the upper edge 30 and the lower edge 32. In the preferred embodiment, a rectangular recess 34 is formed in the planar surface of the cushion. The recess 34 is provided to facilitate the attachment of the strap 20 to the rear portion 24 of the cushion. The recess 34 has a sufficient width to accommodate the width of the strap.

As shown in FIG. 3, the strap 20 is fixedly attached to the rear portion of the cushion by a suitable means such as glue, rivets, or screws. The ends 36 of the strap are provided with an attachment devices such as hook and loop (Velcro) or buckles. The length of the strap must be sufficient to wrap around a seat back at the level of the drivers neck. In the preferred embodiment, the strap is manufactured of woven nylon, is 25 millimeters wide, 914 millimeters long and contains 178 millimeter of the Velcro loop-type material stitched to one end and 178 millimeters of the hook-type material stitched to the opposite end. The Velcro may also be attached by means of adhesive to the nylon strap. An alternative strap 21 (FIG. 2) may be provided to encircle the headrest on a horizontal plane. The alternative strap 21 is used in place of the strap 20 when it is necessary, depending on the shape or manner of attachment of the headrest.

Figure 4:
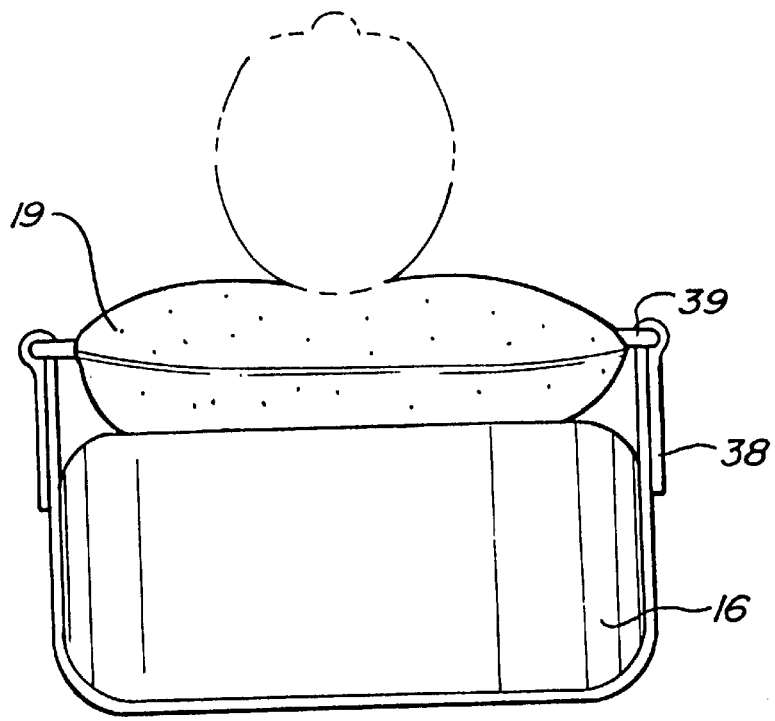
FIG. 4 is a top-view of an alternative embodiment of the neck support device in accordance with the invention.

In a second embodiment shown in FIG. 4, a shorter strap 38 is used and is attached to eyelets 39 at the ends of the cushion 19. The strap 38 may be attached either horizontally or vertically with respect to the longitudinal axis "A" of the cushion.

Figure 5:
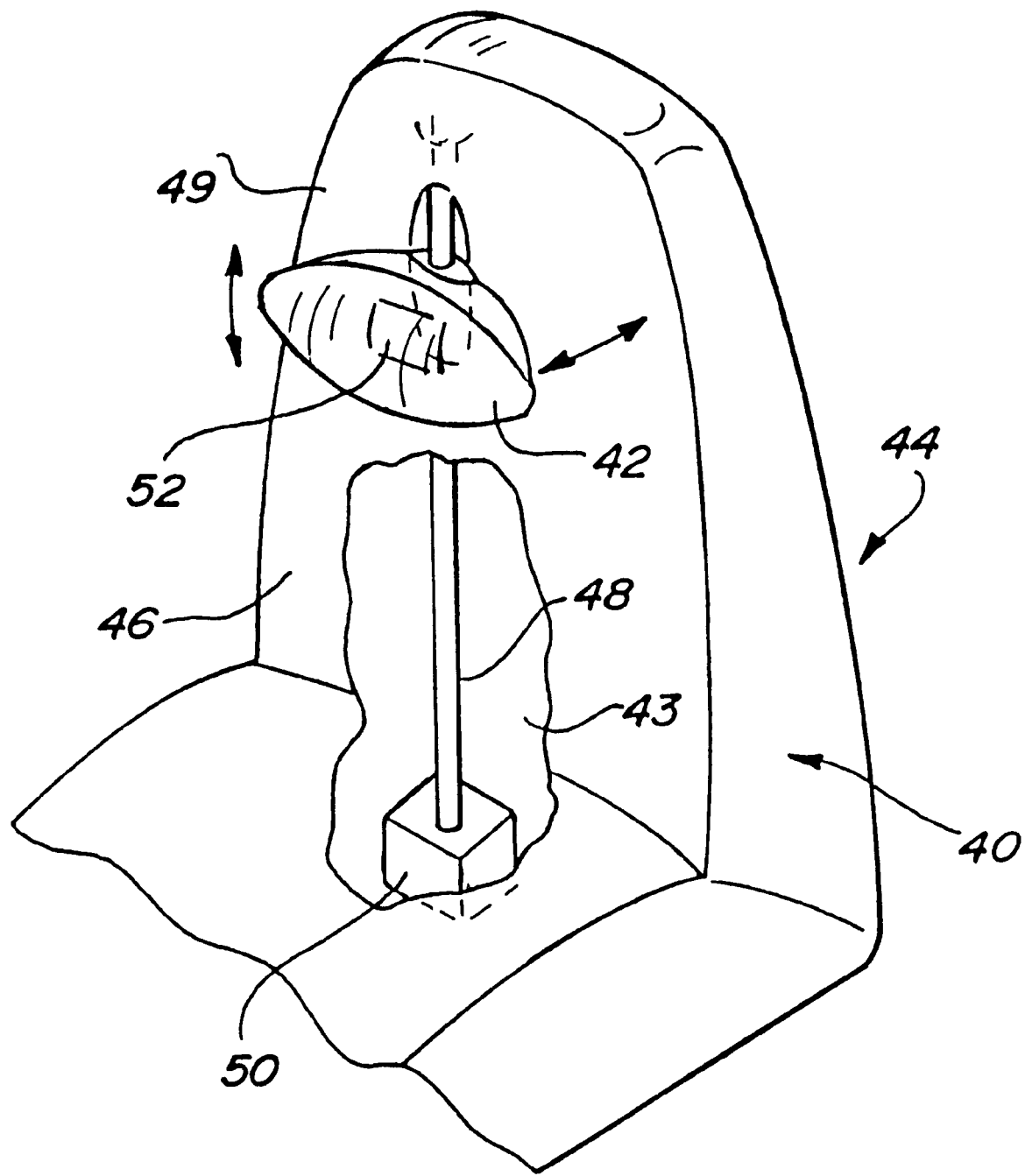
FIG. 5 is a cut away view of an alternative embodiment of the neck support device in accordance with the invention.

As shown in FIG. 5, a third embodiment of the neck support device 40 includes a selectively positionable cushion assembly 42 mounted in a cavity 43 of the seat back 44. The cavity 43 extends vertically through a center portion of the seat back under a fabric or upholstery cover 46. The cover has sufficient width to house the cushion assembly 42 and a vertically extending rod 48. The cover 46 is provided with means for expanding when the cushion is moved outwardly. Suitable means include an accordion pleated 49 or folded portion backed with an elastic band. An electric motor 50 is connected to the rod 48 to move the cushion assembly upwardly and downwardly along the track to permit proper height adjustment with respect to the neck of the individual. The motor is connected to a controller which is mounted in a convenient position on the seat. A second motor 52 is mounted in a box behind a cushion pad to activate a screw mechanism to move the pad inwardly and outwardly to produce the desired amount of support behind the neck. Thus, the cushion assembly 42 is first positioned upwardly or downwardly with respect to the user's neck and then subsequently extended inwardly or outwardly to comfortably and properly position the person's head. The cushion pad is dimensioned in such a manner that the head is firmly but comfortably supported at the neck by the pad.

Having described our invention, however, many modifications, including, but not limited to, materials and attachment means, thereto will become apparent to those of skill in the art to which it pertains without deviation from the spirit of the invention as defined by the scope of the appended claims.

We claim:

1. A neck rest for use with an automobile seat back and an automobile occupant, said neck rest comprising:

a foam cushion molded of a single homogeneous resilient material, said cushion having a top edge and a bottom edge, said top edge and said bottom edge converging in a continuous curve at each of a pair of ends, a front surface extending between said top edge and said bottom edge, a generally planar rear surface having said top edge and said bottom edge, said rear surface having an ellipsoidal shape having a longitudinal axis, said rear surface having a central recess spaced inwardly from said top and bottom edge, said cushion having a center portion being centrally disposed between said pair of ends, said cushion tapering toward said longitudinal axis of said rear surface from said center portion to each of said ends, said center portion having a predetermined thickness greater than the predetermined thickness of each of said pair of ends, said cushion thus having a shape of a football bisected on its longitudinal axis;

means for mounting said cushion to said automobile seat back, said means for mounting including a strap, said means for mounting also including a first hook member and a first loop member, one of said first hook member and said first loop member being mounted in said recess an other of said first hook member and said first loop member being mounted to sad strap, said strap having a second loop member and a second hook member being mounted to said strap for interconnection therebetween, said means for mounting facilitating mounting of said strap in one of a horizontal and a vertical alignment around a portion of said seat back with said first hook and loop members connected together and said second hook and loop members being connected together:

said cushion thereby forming the convex shape of the front of the cushion relative to the rear surface adapts to the back of the automobile occupant's head and neck and creates an unobstructed path for the automobile occupant's head when the automobile occupant's head turns in the horizontal plane.

2. A neck rest as in claim 1, wherein the center portion has a semicircular cross section.

\* \* \* \* \*